Aug. 8, 1967
H. C. MILLER
3,335,256
METHOD OF ATTACHING SEPARATELY-FORMED
DIAMOND SAW TEETH TO STEEL SAW BLADES
Filed Jan. 8, 1965
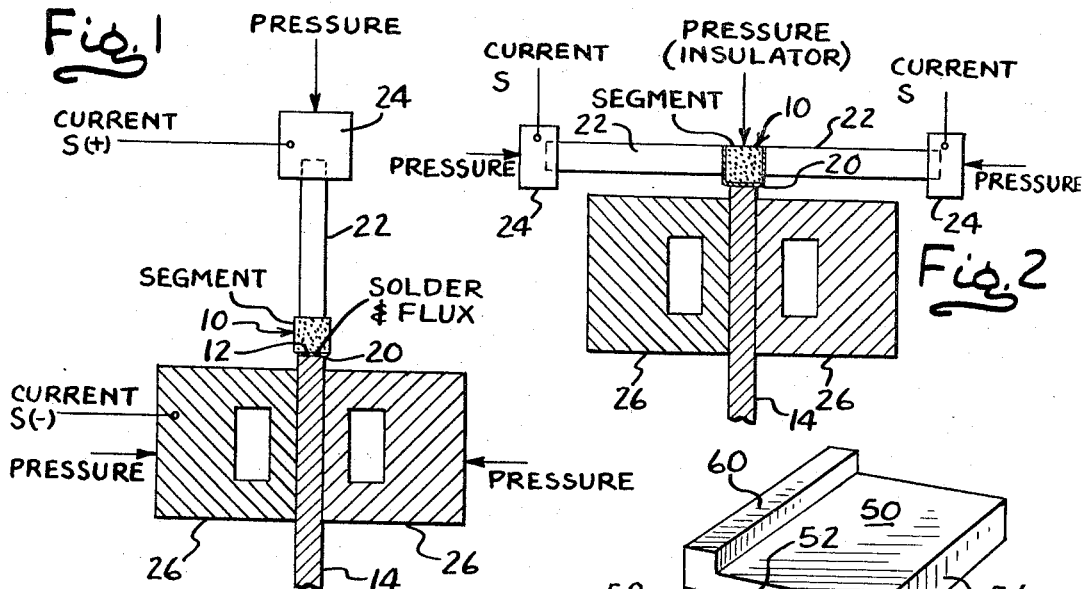
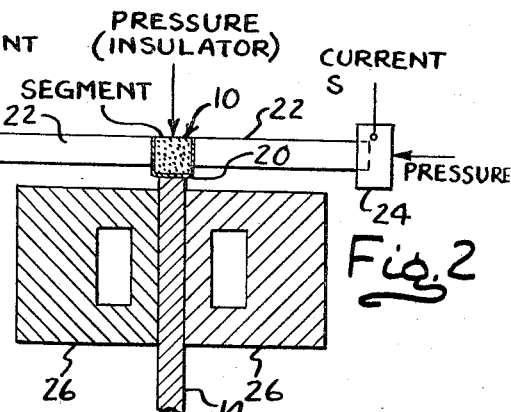
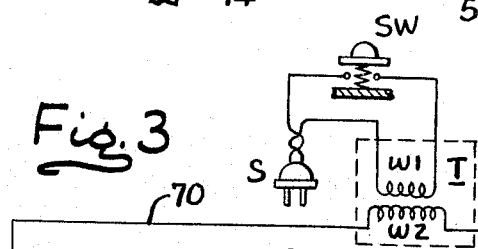
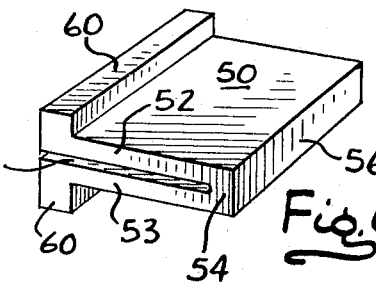
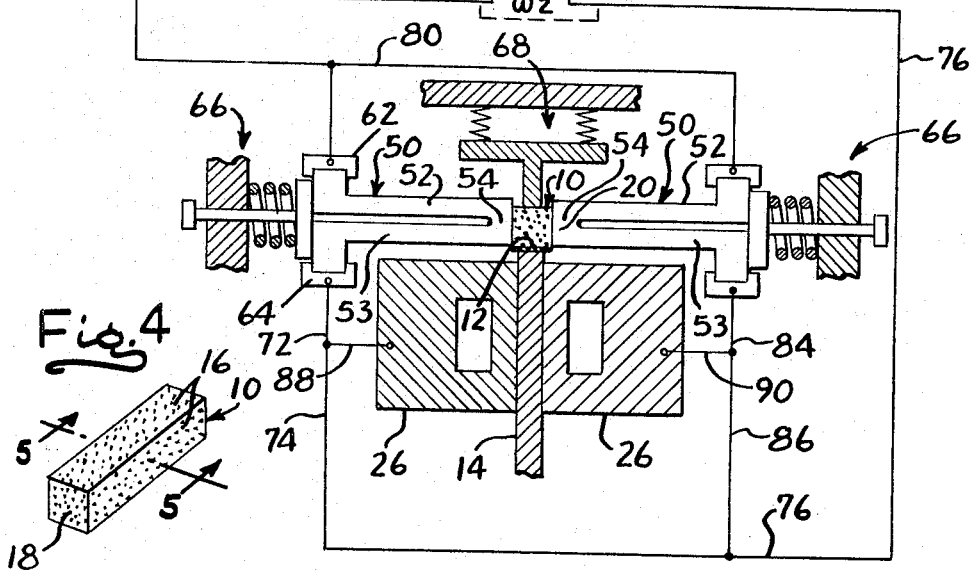
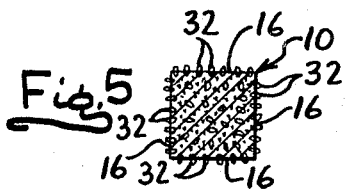
INVENTOR
HAROLD C. MILLER
by: Norman Gerlach
ATTY.

3,335,256
METHOD OF ATTACHING SEPARATELY-FORMED DIAMOND SAW TEETH TO STEEL SAW BLADES

Harold C. Miller, Chicago, Ill., assignor to Super-Cut, Inc., Chicago, Ill., a corporation of Illinois
Filed Jan. 8, 1965, Ser. No. 424,359
1 Claim. (Cl. 219—85)

ABSTRACT OF THE DISCLOSURE

A method of resistance brazing metallic saw tooth segments to the periphery of a large diameter circular disk-like saw blade. Each brazing operation is accomplished by positioning the saw tooth on the blade in the presence of a brazing compound. Hair-pin type electrodes are applied to the opposite sides of the tooth. Current is passed through the electrodes to heat the same and melt the compound. Finally, current is passed through one leg of each electrode, the tooth and the blade to complete the brazing operation.

---

The present invention relates to an improved method of attaching saw teeth to saw blades. The invention is applicable to rotary saws for sawing limestone, marble, granite and the like, as well as to reciprocating saws for the same purpose. The invention is specifically concerned with application by an electric resistance brazing operation of so-called diamond saw teeth to steel saw blades, such teeth consisting of separately formed, block-like cutting segments in the form of sintered metal matrices and crushed or fragmented diamond particles distributed substantially uniformly throughout the matrices.

Heretofore, it has been common practice to apply diamond saw teeth or cutting segments to a steel saw blade by a brazing operation involving the use of the fluxing compound and silver solder, a heat torch or an induction coil being utilized to melt the solder. This heats a large area of the steel blade in the vicinity of teeth application, thus warping the blade, as well as drawing the temper of the steel. In addition to this, the process is time-consuming and requires the use of highly skilled labor. In an effort to reduce the time that is involved in applying diamond teeth to steel saw blades, attempts have been made to resistance braze them in position on the blades. Such attempts, however, have not proven to be altogether satisfactory.

According to one resistance brazing method which has been tried, the various diamond teeth are initially provided with silver solder. Then, in the application of each tooth to the saw blade, the tooth is first positioned on the blade; a suitable fluxing compound is then applied to the brazing region; the tooth is then yieldingly pressed against the blade; and, finally, welding current is passed through the tooth and the blade, thus melting the solder and effecting the brazing operation. Due in part to the presence of protruding non-conducting diamond particles on the surface of the block-like diamond tooth that is to be welded to the steel blade, and in part to the non-conducting nature of the fluxing compound that is ordinarily employed, difficulty is encountered in attaining an initial flow of current from the tooth through the protruding diamond particles and the fluxing compound to the steel blade. Particularly is difficulty encountered in causing the current to flow through fluxing compound which has hardened on the contacting end of the electrode after a previous brazing operation. This fluxing compound hardens on the electrode in the form of a tough non-conductive skin which normal brazing pressures fail to penetrate. If an initial conductive current path obtains, the resistance brazing operaiton will take place to completion but, more often than not, such an initial conductive path is non-existent and when the welding current is turned on, nothing happens and the silver solder is not heated so that it melts.

The present invention is designed to overcome the above-noted limitations that are attendant upon previously utilized or conceived resistance brazing methods for applying diamond teeth to a steel saw blade and, toward this end, the invention contemplates two alternative methods of resistance brazing wherein welding current is initially isolated from the steel blade and caused to pass through each of two carbon brush electrodes which straddle and electrically contact the diamond saw tooth being applied, such tooth being mounted on the working edge of the steel blade as heretofore described. Resistance heating of the two electrodes in this manner effects a flow of heat by conduction into the tooth and melts any residual non-conducting skin of hardened fluxing compound which may be present on the electrode so that the electrode will penetrate the compound and allow the electrode to make good electrode contact with the steel blade for solder melting purposes.

According to one of the two methods of the present invention, initial resistance heating of the two carbon brush electrodes is predicated upon the flow of welded current in series relationship, first through one electrode, then through the diamond tooth, and finally through the other electrode. While such a method represeuts an improvement over conventional resistance brazing methods, it likewise has its limitations although to a lesser degree. Again, diamond particle exposure or protuberancy and the presence of hardened fluxing compound on the surface of the electrodes inhibit initial flow of welding current into and out of the tooth from one electrode to the other. However, since welding current is not required to enter the steel blade from the tooth when the parts are cool, a greater percentage of "starts" results from such method than does with conventional methods of resistance brazing diamond saw teeth to steel saw blades.

According to the other and preferred form of the invention, there is contemplated a novel method whereby in the applicaion of a given block-like diamond saw tooth to a steel saw blade, the tooth is, as heretofore mentioned, positioned on the saw blade and is then caused to bear against the blade under pressure. Specifically designed carbon brush electrodes are then applied to the sides of the tooth and thereafter welding current is simultaneously applied to and caused to flow through each electrode independently of the other electrode. This has the effect of immediately heating the two electrodes to a degree above the melting point of the silver solder regardless of whether the electrodes do or do not make initial good contact with the tooth. As soon as the electrodes are thus heated, the hardened fluxing compound will melt and the silver solder in the immediate vicinity of the electrodes also become melted so that the electrodes will move into intimate electrical contact with the tooth. The tooth, now heated by intimate contact with the two heated electrodes, causes the silver solder in the vicinity of the steel blade to melt, whereupon the tooth then makes good electrical contact with the steel blade. At this time, upon melting of the solder, a second path for welding current is automatically established, this path extending through both electrodes, the tooth and the steel blade. By such a method, initial current failure is precluded because the first surge of welding current through the two electrodes raises them to a high heat so that they will melt the hardened flux and the silver solder in their immediate vicinity and thus make good electrical contact with the tooth which, in turn, will make good electrical contact with the steel blade, after which conventional current flow from the electrodes through the tooth to the blade will automatically take place.

The provision of resistance brazing methods of the character briefly outlined above and wherein initial electrode heating for the purpose of initial solder melting constitutes the principal object of the invention, another object is to provide a novel form of electrode which, by reason of its shape, makes possible the method of the present invention.

Other objects and advantages of the invention, not at this time enumerated, will become readily apparent as the nature of the invention is better understood.

In the accompanying single sheet of drawings forming a part of this specification, the improved methods of the present invention, together with apparatuses by means of which the methods may be practiced, are schematically illustrated.

In these drawings:

FIG. 1 is a schematic view illustrating certain current flow patterns that are involved in connection with one method of applying diamond saw teeth to a steel saw blade;

FIG. 2 is a schematic view similar to FIG. 1 but illustrating certain other flow patterns that are involved in connection with another method of diamond saw teeth application;

FIG. 3 is a schematic view similar to FIGS. 1 and 2, but in somewhat more detail, illustrating the current flow patterns that are involved in connection with still another method of the present invention, and also illustrating the basic apparatus by means of which such method is carried out;

FIG. 4 is a perspective view of a diamond saw tooth;

FIG. 5 is an enlarged sectional view taken on the vertical plane indicated by the line 5—5 of FIG. 4; and FIG. 6 is a perspective view of one of the carbon brush-type electrodes that are employed in connection with the present invention.

Referring now to the drawings in detail, the present invention pertains to the resistance brazing of diamond saw teeth, such as the tooth which is illustrated in detail in FIGS. 4 and 5 and is designated by the reference numeral 10, to the working edge 12 of a steel or other metal saw blade. A portion of the blade is identified in the drawings by the reference numeral 14. The blade may be of circular design and the diamond saw teeth may be applied to the periphery thereof in circumferentially spaced relationship to produce a rotary segmental saw of the type which is illustrated and described in United States Patent No. 2,990,828, granted on July 4, 1961, and entitled, "Rotary Segmental Saw With Rim Rigidifying and Silencing Means," or it may be of the reciprocating type in which the working edge thereof is of straight linear extent. Irrespective, however, of the particular shape of the saw blade 14, the essential features of the invention remain substantially the same.

The teeth 10 which are to be applied to the working edge 12 of the blade 14 are known as diamond cutting segments and one of them is illustrated in detail in FIG. 4. Such segment is in the form of a parallelepiped which is of elongated rectangular design and has four elongated rectangular side faces 16 and substantially square end faces 18. When operatively applied to the working edge 12 of the blade 14, one of the four side faces 16 opposes the edge and is bonded thereto by silver solder such as is shown at 20 in FIGS. 1, 2 and 3. If the working edge 12 of the blade 14 is linearly straight, the adjacent side face 16 will, of course, lie coextensively flush with such edge. If the working edge 12 of the blade is circular, such side face will lie in tangential relationship on the edge but, usually, the relationship of the diameter of the blade 14 to the linear extent of the segment is such that this tangency is scarcely apparent and the silver solder 20 will fill any gap which may occur between portions of the said adjacent side face 16 and the working edge 12 of the blade. Physically, the block-like cutting segment or saw tooth 10 is in the form of a sintered metal matrix and crushed or fragmented diamonds substantially uniformly throughout the matrix.

One method by means of which a diamond saw tooth, such as the tooth 10, may be resistance brazed to the working edge 12 of the blade 14 is schematically illustrated in FIG. 1. According to this method, one of the side faces of the tooth is positioned on the working edge 12 so that it overhangs to a slight extent the sides of the blade 14. A suitable fluxing compound and the necessary silver solder are applied in the vicinity of the brazing region in the usual manner. Thereafter, a carbon brush electrode 22 is applied to the uppermost side face of the tooth 10 by means of a brush holder 24 and pressure such as is schematically illustrated by the labeled arrow is brought to bear upon the electrode 22 tending to force the latter downwardly into firm contact with the tooth 10 and, in turn, to force the tooth into firm contact with the working edge 12 of the blade 14. Welding current is then caused to flow from a source S (secondary coil of a welding transformer not shown) through the brush holder 24, the electrode 22, the tooth 10 and the blade 14, from whence it flows through one of two water-cooled contact pads 26 and back to the source S. The two water-cooled contact pads are disposed in straddling relationship on opposite sides of the blade 14 in the general region of brazing and serve to conduct the tremendous heat of brazing away from the blade. These pads are caused to bear against the opposite sides 28 and 30 of the blade 14 under pressure as indicated by the labeled arrows.

According to the method of FIG. 1, upon initial flow of welding current through the silver solder 20, heat of resistance is generated and the solder is melted so that brazing takes place. Upon discontinuance of the flow of welding current, the cooling pads 26 rapidly conduct heat away from the brazing region so that the solder hardens to complete the brazing operations.

The percentage of successful weld-type bonds which may be performed by the above described brazing method is insufficient to render the method acceptable for commercial use, although satisfactory welds or bonds in a large number of cases may be attained. An eighty-five percent average of successful welds or bonds is insufficient to render such a method commercially acceptable since the unsuccessful attempts to secure a weld or bond must be augmented by tedious torch or coil heating of the brazing region to attain initial melting of the fluxing compound and silver solder.

The limitation which is attendant upon the method that is illustrated in FIG. 1 resides in the inability to attain initial flow of welding current from the electrode 22 into the diamond saw tooth 10, or from the tooth 10 into the blade 14. As shown in FIG. 5, the portions of the diamond particles that are located or disposed adjacent to the side faces of the tooth protrudes as indicated at 32 slightly beyond said side faces. Since these protruding portions are non-conductive, it cannot be assured in all instances that either the electrode 22 will make good electrical contact with the tooth 10 or the latter will make good contact with the working edge 12 of the steel blade 14. Furthermore, if the electrodes are coated with a skin of hardened flux, a high resistance path is established through which welding current will not flow. Any or all of these factors may prevent proper or sufficient initial current flow in the welding circuit to effect initial melting of the silver solder 20. Sometimes a percussive blow on the side of the blade 14 will help to start a current flow; sometimes not.

According to the present invention, an improved tooth-brazing method is schematically illustrated in FIG. 2. Here, instead of relying upon initial current flow through the steel blade 14, the welding current is caused to flow from one electrode 22 through the tooth 10 to a second electrode 22. The tooth 10 is applied to the working edge 12 of the blade 14 and the side faces of the tooth are cause to bear against the two electrodes 22. Downward pressure is applied to the tooth as heretofore described in connection with the method of FIG. 1. Welding current is then caused to flow from the source S, through one brush holder 24 and its electrode 22, to the tooth 10 and from thence through the other electrode and its brush holder back to the source S. Flow of welding current in the welding circuit as just described causes the two electrodes to become intensely hot, whereupon any residual hardened fluxing compound is melted and the diamond saw tooth becomes heated so that the silver solder melts, thus effecting the brazing operation. The two cooling pads 26 of FIG. 2 conduct heat away from the brazing region as heretofore but they form no part of the welding current circuit and neither does the blade 14 itself.

The method of FIG. 2, although an improvement over the method of FIG. 1, is subject to the same limitations that are attendant upon the former method, but to a materially lesser degree. The brush-type electrodes 22, being formed of relatively soft carbon, are more likely to be pressed into good electrical contact with the tooth 10 than is the case when the tooth is required to be pressed into good electrical contact with the working edge of the steel blade 14. Thus a higher percentage of weld-type bonds will be attained by the method of FIG. 2 inasmuch as melting of the silver solder 20 between the tooth and the blade is not a prerequisite of current flow in the welding circuit. However, the method of FIG. 2 is not infallible and the percentage of welds or bonds which may be attained still is not sufficient to render the method completely reliable for commercial use.

In FIG. 3, a commercially reliable method of effecting brazing of the diamond saw tooth 10 to the working edge 12 of the blade 14 is disclosed, this method constituting the preferred method of the present invention. The method of FIG. 3 is predicated upon the use of a novel form of welding or brazing electrode, two such electrodes being employed and each being designated in its entirety by the reference numeral 50. Each electrode is in the form of a carbon brush of generally U-shaped cross section and including parallel legs 52 and 53 and a short connecting bight portion 54. The outer face 56 of the bight portion of each electrode is of elongated rectangular configuration and constitutes a contact face which is designed for face-to-face electrical contact with one side face 16 of the tooth 10. Its length and width are approximately commensurate with the length and width of the adjacent side face 16 so that a substantial area of contact will be made with such side face when the electrode is applied thereto. The depth of the slot 58 which exists between the two legs 52 and 53 of each electrode is sufficiently great that the proper degree of ohmic resistance will be inherent in the electrode to generate intense heat resulting in incandescence of the electrode when welding current is applied thereto and caused to flow from the distal end of one leg, through such leg, the bight portion 54 and the other leg. The ohmic value of either electrode leg must, however, not be below such predetermined minimum that the leg will not withstand the application of full welding voltage thereto when the other leg is shunted out of the circuit as is the case in connection with the method of FIG. 3 and as will be described in detail presently. The distal or terminal ends of the two legs 52 and 53 are provided with laterally and outwardly turned rectangular enlargements 60 in the form of ribs which are provided for the purpose of facilitating attachment of each electrode 50 to a pair of electrode holders such as the holders which are identified by the reference numerals 62 and 64.

In carrying out the method of FIG. 3, the block-like diamond saw tooth 10 is positioned on the working edge 12 of the blade 14 as heretofore described and the fluxing compound and solder are applied to the region of contact.

The two electrodes 50 are thereafter pressed against the opposed vertically disposed side faces 16 of the tooth so that the outer contact faces 56 of the bight portions 54 of the electrodes contact such side faces, suitable spring-actuated pressure means such as has been indicated at 66 being employed for attaining the necessary degree of yielding pressure. Additional pressure means 68 may be employed for yieldingly pressing the tooth 10 downwardly against the working edge 12 of the blade 14, this latter pressure means being of an insulating nature.

With the electrodes 50 and the pressure means 66 and 68 in position as described above upon closure of the operating switch SW, welding current will flow from the secondary winding $w2$ of the welding transformer T through both electrodes 50. The circuit for one of the electrodes extends from the winding $w2$, through a conductor 70, the associated brush holder 62, the leg 52, the bight portion 54, the leg 53, the other associated brush holder 64, conductors 72, 74 and 76, back to the secondary winding $w2$. The circuit for the other electrode 50 extends from the secondary winding $w2$, through the conductor 70, a conductor 80, the associated brush holder 62, the leg 52, the bight portion 54, the leg 53, the other brush holder 64, conductors 84 and 86 and the conductor 76 back to the secondary winding $w2$. The transformer T is provided with a primary winding $w1$ which is operatively connected to the source S of energizing current, the switch SW being disposed in the primary circuit.

The flow of current through both electrodes 50 in the manner indicated above will cause immediate heating of the two electrodes to a moderate degree of incandescence and the proximity of the contact surfaces 56 of these electrodes to the adjacent side faces 16 of the tooth 10 will cause heating of the tooth to a degree sufficient to melt any residual fluxing compound which may be present on the electrodes. Even if poor electrical contact, or no electrical contact whatsoever, obtains between the electrodes 50 and the tooth, the parallel circuits extending through the long resistance paths of these two electrodes will be established and both electrodes will become heated.

As soon as the silver solder and the fluxing compound have become melted, good electrical contact between both electrodes 50 and the tooth 10 will be established and also good electrical contact between the tooth and working edge 12 of the blade 14 will be established. At this time, and without any attention whatsoever on the part of the operator, a second circuit will be established through each electrode 50. In the case of one electrode, this second circuit will extend from the secondary winding $w2$ of the transformer T, through the conductor 70, the associated brush holder 62, the leg 52, the tooth 10, the blade 14, one of the two water-cooled contact pads 26, a conductor 88, and the conductors 74 and 76 back to the secondary winding $w2$. The second circuit for the other electrode will extend from the secondary winding $w2$, through the conductors 70 and 80, the associated brush holder 62, the leg 52, the tooth 10, the other contact pad 26, a conductor 90, and the conductors 86 and 76 back to the secondary winding $w2$. The two parallel circuits just described, in effect, establish a shunt for the original parallel circuits.

Because the resistance path through each electrode 50 is now only approximately one-half of its former value when both legs of each electrode were involved, intense heating of the current-carrying leg of each electrode will take place, thus further heating the tooth 10 for brazing purposes. Upon opening of the switch SW and cooling of the blade 14 and the tooth 10, the brazing operation will be completed. The cooling pads 26 function as heat sinks so that undue heat will not enter the blade.

It is to be distinctly understood that the disclosures of FIGS. 1 to 3, inclusive, are purely schematic disclosures and, except for the specific construction or design of the electrodes 50 per se, the mechanical instrumentalities disclosed in these views are merely exemplary of pressure-applying, electrode-holding and blade-cooling means which are not necessarily the preferred means suitable for commercially practicing the invention. For a more commercially acceptable arrangement of instrumentalities by means of which the method of FIG. 3 may be carried out, and one which utilizes the specific electrodes 50 disclosed herein, reference may be had to my copending United States patent application Ser. No. 424,358, filed on Jan. 8, 1965, and entitled Fixture for Resistance-Brazing Diamond Saw Teeth in Position on Steel Saw Blades.

The invention is not to be limited to the specific method steps set forth herein or to the particular apparatus disclosed therein inasmuch as various departures therefrom are contemplated within the scope of the appended claim.

Having thus described the invention what I claim as new and desire to secure by Letters Patent is:

The method of resistance brazing two initially separate members together, one of said members comprising a metallic saw blade and the other member comprising a metallic saw tooth which is to be applied to the periphery of the saw blade, said method comprising:

(a) coating an area of one of said members with a fusible brazing alloy, (b) effectively positioning the saw tooth under pressure against the periphery of the saw blade with the thus coated area interposed between the two members, (c) bringing the bight portions of two individual hairpin resistance type electrodes into firm engagement with the opposite sides of the saw tooth under pressure, (d) electrically connecting the distal ends of the leg portions of each electrode to the outlet terminals of a source of welding current while simultaneously electrically connecting the saw blade to one of said outlet terminals, thus establishing a current path through both legs and the bight portion of each electrode and the source and, in addition, a potential current path through one leg only of each electrode, the tooth, the saw blade and the source, and (e) energizing the source of welding current to cause current to flow through the legs and bight portions of both electrodes to heat the bight portions of the electrodes and consequently the saw tooth in contact therewith, thus fusing the adjacent coating of brazing alloy and attaining metal-to-metal contact between the saw tooth and blade and consequent automatic flow of current in said potential current path.

References Cited

UNITED STATES PATENTS

| | | | |
|---|---|---|---|
| 1,350,876 | 8/1920 | Mayer et al. | 13—22 |
| 1,613,957 | 1/1927 | Madden | 219—86 |
| 3,099,738 | 7/1963 | Sadowski | 219—85 |
| 3,263,059 | 7/1966 | Rzant | 219—56 X |

FOREIGN PATENTS

| | | |
|---|---|---|
| 260,764 | 6/1913 | Germany. |

RICHARD M. WOOD, *Primary Examiner.*

B. A. STEIN, *Assistant Examiner.*